Feb. 20, 1951 C. FULOP 2,542,186
MOTION-PICTURE FILM REEL
Filed Dec. 23, 1947
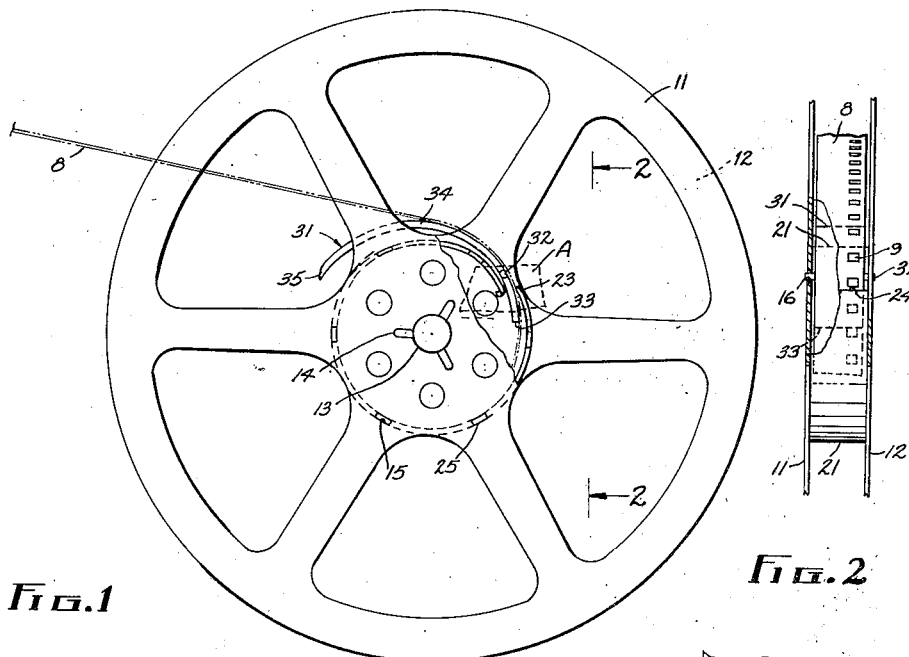
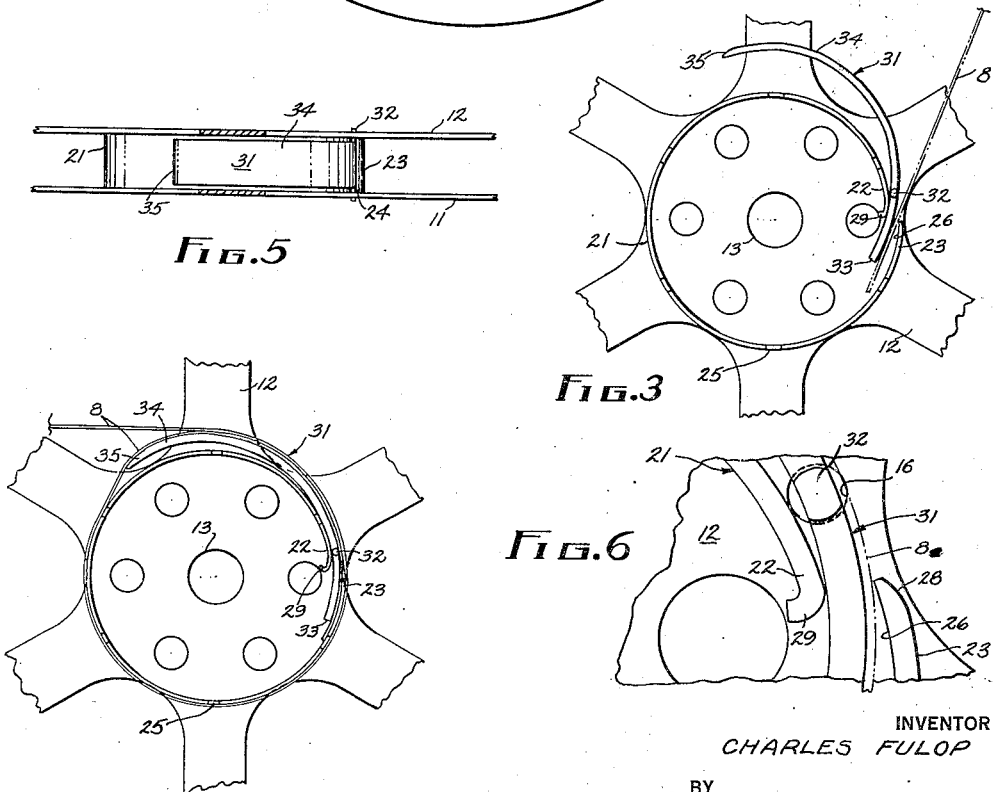
INVENTOR
CHARLES FULOP
BY
ATTORNEY Patented Feb. 20, 1951

2,542,186

UNITED STATES PATENT OFFICE 2,542,186

MOTION-PICTURE FILM REEL

Charles Fulop, Cleveland, Ohio

Application December 23, 1947, Serial No. 793,450

2 Claims. (Cl. 242—74)

This invention relates to spools or reels and particularly to reels for retaining motion picture film.

Conducive to a better understanding of this invention, it should be pointed out that motion picture film should be supported in a reel in a manner enabling its inner end to be easily freed from the reel so that when the end of the film is reached during projection it will come off of the reel without damage to either the film, the reel or projector. Heretofore some types of spools had teeth which engaged the sprocket holes of the film so that when the end of the film is reached the film would break or the sprocket holes would tear. It is also important to have a reel which will simplify and facilitate the start of the winding of the film on the reel.

It is therefore the primary object of this invention to provide a reel which quickly and easily engages a free end of a length of film or ribbon without damage thereto to facilitate the winding thereof.

Another object is to provide a reel of the type stated which easily releases the end of the film or ribbon without damage thereto.

A further object is to construct such device of simple easily made parts so that the device is economical to manufacture and assemble.

These and other objects of the invention will become apparent from a reading of the following specification and claims, together with the accompanying drawing in which like parts are referred to and indicated by like reference characters and wherein:

Figure 1 is a side elevation of a reel made in accordance with this invention, with parts thereof broken away to show construction and containing a length of amateur type motion picture film;

Figure 2 is an end view of a part of the reel taken substantially along the line and in the direction of the arrows 2—2 of the Figure 1;

Figure 3 is an enlarged side view of a part of the reel with one flange removed and showing the clamp member in open position capable of either receiving the film for winding or of releasing the same after unwinding;

Figure 4 is a view similar to that of Figure 3, but showing the clamp member in a closed position engaging the film for winding;

Figure 5 is an enlarged top plan view of a portion of the reel without film thereon; and Figure 6 is an enlarged side view of the portion of the reel enclosed at A in the Figure 1.

Referring to the drawing, there is shown a pair of stamped metal side flanges 11 and 12 having a hollow hub 21 mounted therebetween. The pair of flanges has a central hole 13 and a key-way 14 therein for receiving the mandrel of the motion picture projector which is not shown.

Each of the flanges 11 and 12 has a series of small slots 15 around the central hole 13 for receiving the hereinafter described lugs or tabs 25 of the hub 21. The pair of flanges also has aligned holes 16 for receiving the pivot pins 32 of the hereinafter described clamp member 31. The flanges are spaced apart the width of the ribbon or film 8 to be received and they also have additional openings or holes therethrough somewhat as shown to make them lighter and easier to handle and use.

The hub 21 is also made of stamped sheet metal and is simply a length of metal bent slightly spiraliform, as shown. The inner and outer ends 22 and 23 of the hub 21 are oppositely directed and spaced, as shown, to form a small laterally extending slot 24 which is substantially tangent to the circumference of the hub. The hereinafter described clamp member 31 and the film 8 extend through the slot. The side edges of the hub 21 are provided with lugs or tabs 25 which tightly fit the slots 15 of the flanges and are peened in place after being inserted therein. When so assembled, the basic reel is formed.

The lateral edge of the outer end 23 of the hub is beveled somewhat as shown at 28 to prevent an unfinished or sharp edge cutting or otherwise damaging the film 8. The lateral edge of the inner end 22 is bent inward to form an abutment 29.

The clamp member 31 which is also referred to herein as a lever is a piece of sheet metal of a width slightly less than the distance between the two flanges 11 and 12. It is curved to conform with the curvature of the hub 21 and its length is roughly about one-third of the circumference of the hub. Each of the side edges of the clamp member 31 has a small pin 32 which pivots and fits into the holes 16 of the flanges. The pins 32 and the holes 16 are aligned and the clamp member 31 is free to pivot on the pins as shown. The short end or arm 33 of the clamp member extends through the slot 24 of the hub and its upper surface and lateral edge co-act with or engage the inner wall 26 of the hub. The long outer arm 34 of the clamp member fits neatly over the hub but does not quite touch it. The lateral edge of the long outer arm is beveled somewhat as indicated by the character 35 to prevent damage to the film.

When winding a film or ribbon on this novel reel, the reel is positioned so that gravity causes the clamp member 31 to open. That is, when the inner end or arm 33 of the clamp member touches the abutment 29, the long end or arm 34 of the lever is away from the hub 21. The free end of the film 8 is projected a short distance through the slot 24 and between the upper surface of the clamp member and the inner surface 26 of the hub. The film is then brought around the hub as shown so that the long arm 34 of the lever proximates the hub. The film is continued around the hub fairly tight. The pressure of the film on the long arm 34 causes the short arm thereof, together with the outer end of the hub 21, to pinch or retain the end of the film thus projected through the slot. The more the long end of the lever is pressed, the tighter the short end thereof will engage and retain the film.

When the film is unwound, for example during projection, the end easily comes out of the slot as soon as pressure is removed from the long arm of the clamp member. No damage can occur to the film at any time when on the reel, since there are no teeth or projections which engage the sprocket holes 9 of the film.

Having thus disclosed the invention in its preferred form, it is to be understood that the specific embodiments thereof as described and illustrated herein are not to be taken in a limited sense as there may be other forms or modifications of the invention which should also be construed to come within the scope of the appended claims.

I claim:

1. A motion picture film reel, comprising in combination, a pair of spaced side flanges, a spiraliform hub member mounted between the said flanges, the said hub member having spaced inner and outer ends forming a tangential slot capable of receiving the aforesaid film, the said inner end of the hub having an abutment thereon, and an arcuate lever mounted between the said flanges, the said lever having an inner arm below the received film and co-actable with the hub member outer end when in a closed position and engageable with the said abutment when in an open position, and also having an outer arm capable of being depressed by the said film.

2. A motion picture film reel, comprising in combination, a pair of spaced side flanges; a spiraliform sheet material hub mounted between the said flanges, the said hub having spaced oppositely directed ends forming a laterally extending tangential slot capable of receiving an end of the aforesaid film, the said hub also having a concave inner surface and a convex outer surface; and an arcuate sheet material lever pivotally mounted between the said flanges proximate the outer convex surface of the said hub and ahead of the said tangential slot, the said lever having a short arm extending through the said slot and engageable with the inner concave surface of the said hub, and a long arm engageable with the outer convex surface of the said hub and capable of being depressed by the aforesaid film.

CHARLES FULOP.

REFERENCES CITED

The following references are of record in the file of this patent:

UNITED STATES PATENTS

| Number | Name | Date |
|---|---|---|
| 1,578,894 | Joy | Mar. 30, 1926 |
| 2,373,704 | Obolensky | Apr. 17, 1945 |
| 2,417,572 | Storck et al. | Mar. 18, 1947 |

FOREIGN PATENTS

| Number | Country | Date |
|---|---|---|
| 270,188 | Germany | Dec. 13, 1912 |